United States Patent [19]

Maxwell et al.

[11] Patent Number: 5,584,925
[45] Date of Patent: Dec. 17, 1996

[54] CHEMICALLY AGGREGATED KAOLIN CLAY PIGMENT AND PROCESS FOR MAKING THE SAME BY PHOSPHATE BONDING

[75] Inventors: Chris B. Maxwell, Evans; Prakash B. Malla, Martinez, both of Ga.

[73] Assignee: Thiele Kaolin Company, Sandersville, Ga.

[21] Appl. No.: 494,920

[22] Filed: Jun. 26, 1995

[51] Int. Cl.⁶ .............................. C04B 14/10; C09C 3/12
[52] U.S. Cl. ...................... 106/486; 106/416; 106/483; 106/485; 501/146
[58] Field of Search .................... 106/416, 485, 106/486, 483; 501/146

[56] References Cited

U.S. PATENT DOCUMENTS

| | | | |
|---|---|---|---|
| 3,586,523 | 6/1971 | Fanselow et al. | 106/288 B |
| 4,812,299 | 3/1989 | Wason | 423/328 |
| 4,816,074 | 3/1989 | Raythatha et al. | 106/486 |
| 4,851,048 | 7/1989 | Jones et al. | 106/486 |
| 4,935,062 | 6/1990 | Brown et al. | 106/486 |
| 4,976,786 | 12/1990 | Dunaway et al. | 106/486 |
| 5,089,056 | 2/1992 | Shi et al. | 106/486 |
| 5,190,902 | 3/1993 | Demmel | 502/63 |
| 5,203,918 | 4/1993 | Rice | 106/486 |
| 5,223,463 | 6/1993 | Bilimoria et al. | 106/416 |
| 5,232,495 | 8/1993 | Shurling, Jr. et al. | 106/486 |
| 5,288,739 | 2/1994 | Demmel | 502/63 |

*Primary Examiner*—Mark L. Bell
*Assistant Examiner*—Michael Marcheschi
*Attorney, Agent, or Firm*—Jones & Askew

[57] ABSTRACT

An opacifying kaolin pigment with improved porosity, light scattering ability (opacity), gloss, and ink receptivity over that of the starting pigment is manufactured by a process which comprises the steps of treating an aqueous solution of kaolin with a phosphate compound, using the endogenous aluminum leached from kaolin and/or adding a soluble aluminum compound and increasing the pH of the mixture.

23 Claims, No Drawings

CHEMICALLY AGGREGATED KAOLIN CLAY PIGMENT AND PROCESS FOR MAKING THE SAME BY PHOSPHATE BONDING

TECHNICAL FIELD

This invention relates to aggregated opacifying kaolin clay pigments and to a process for making the same. In a more specific aspect, this invention relates to opacifying kaolin clay pigments that are aggregated by a chemical process which includes the treatment of fine- or coarse-grained kaolin particles with acidic phosphate-containing compounds at temperatures between 5° C. and 200° C. The aggregation of kaolin particles is believed to occur as the result of the precipitation of amorphous aluminum phosphate.

This invention is to be understood as applying to all types of structured kaolin clay pigments. The aggregated kaolin clay pigments resulting from this process display improved ink receptivity, light scattering ability (also referred to as opacity), porosity, gloss and paper coating performance compared to the starting pigment.

BACKGROUND OF THE INVENTION

Kaolin is a naturally occurring, relatively fine, white clay mineral which may be generally described as a hydrated aluminum silicate. Kaolin has long been used as a coating and filler pigment for paper. Use of kaolin as a coating pigment improves various properties, such as brightness, color, gloss, smoothness, light scattering ability, uniformity of appearance and printability of a paper. As a filler, kaolin is used to extend fiber and reduce cost and improve opacity, brightness and other desirable characteristics. The chemically inert kaolin also possesses desirable low viscosity at high solids content when suspended in an aqueous medium with a small pH adjustment and dispersant additives.

Opacity is one of the most desirable optical properties of pigment coated paper and is directly related to the light scattering ability of the pigment. Light scattering ability of the pigment can be estimated by the light scattering coefficient using the Kubelka-Munk equation as described in TAPPI 1978, Vol. 61, No. 6, pages 78–80. Light scattering is a direct function of the index of refraction of the mineral. Visible light travels through media of different refractive indices at different speeds; faster in a medium with a lower refractive index. As light travels between two media of different refractive indices, the light will change velocity and bend or change direction. Several changes of media and several bendings of incident light will create "scattered" light.

Larger differences in refractive indices between materials will cause more severe distortions of the incident light. Minerals with higher refractive indices will scatter light more, thus improving opacity, than those of lower refractive indices. Titania ($TiO_2$), depending on its crystal structure (rutile or anatase), has a refractive index of 2.55 to 2.7. Kaolin has a refractive index of 1.55. Therefore, a titania pigment will yield a coated paper having greater opacity than a kaolin pigment coated paper at the same coat weight, or lower amounts of titania may be used to match the kaolin opacity. $TiO_2$, however, is an expensive pigment. Therefore, there is a need to develop an opacifying pigment from inexpensive raw material, such as kaolin, that can be used in place of the more expensive $TiO_2$.

Scattering of light by a single pigment can be improved by increasing the number of mineral to air interfaces. The refractive index of air is 1.0 and that of kaolin is 1.55. Increasing the number of times light passes through two media of significantly different refractive indices results in higher chances for separation and diversion of the incident light. The distance traveled in each medium, however, must be about one half to one full wavelength of visible light (approx. 0.2 to 0.5 microns). One can then conclude that arranging the mineral particles in such a way to create 0.2 to 0.5 micron pores (voids) will increase the light scattering ability o pigment, and subsequently the opacity of paper coated with the pigment. Pore size and pore volume can be measured by mercury intrusion as described in the American Society for Testing and Materials (ASTM) method D 4284-92.

In addition to opacity, ink receptivity is a desired characteristic in many coated paper applications. Ink receptivity is the ability of a coating to absorb ink. An optimum ink receptivity is necessary to achieve an efficient transfer of ink to the paper during printing. Pigments created with mineral particles arranged to create pores for light scattering will also possess sufficient volume and capillary action in the open pores to absorb ink, thereby increasing the ink receptivity of the coated paper. The ink receptivity can be measured by applying the K & N ink to the coated samples for 2 minutes and then wiping off the excess ink. The brightness is measured before applying and after removing the ink. The percentage decrease in brightness is directly proportional to ink receptivity, that is, the larger the decrease in brightness, the more receptive the sample to application of ink. This test is described by J. C. Rice, Varnishing Characteristics of Coating Clays and Pigments, TAPPI, Vol. 39 (1), pp. 43–45, and in TAPPI Routine Control Method RC 19 (referenced on page 44 of the preceding article).

The aggregated or bulking pigment is also important for producing lightweight coated paper. Because of its highly opacifying nature, much smaller amounts of aggregated pigment are required to coat paper compared to a conventional pigment, thereby reducing the weight of the paper. An additional benefit of the lightweight coated paper is the reduced cost of postage, handling and shipping.

There are two primary methods for producing aggregated or structured kaolin clay pigments: (1) thermal and (2) chemical. Thermally structured kaolin clay is also called calcined clay which is produced by calcining the kaolin clay to temperatures above 900° C. Specific examples of calcined kaolin are described in Fanselow et al. U.S. Pat. No. 3,586,523.

Several methods have been used to produce chemically aggregated kaolin products. Shi et al. U.S. Pat. No. 5,089,056 discloses the production of chemically modified pigments by hydrothermally reacting kaolin clay with sodium or potassium hydroxide. In this system, the reactants are heated in a closed vessel at temperatures from 150° C. to 200° C. The products are defined as extremely stable aggregates which incorporate light scattering sites.

Wason et al. U.S. Pat. No. 4,812,299 describes the production of synthetic alkali metal aluminosilicates by hydrothermally reacting kaolin clay with alkali metal silicate. In this system, the pressure ranges from about 50 to 360 pounds per square inch (psi) and temperature ranges from 140° C. to 250° C. The products after filtration and spray drying are identified as structured agglomerates formed from the integration of altered kaolin platelets with amorphous alkali metal silicate base-kaolin reaction products. These products are found to be useful as functional fillers, as TiO2 and silica extenders, or as reinforcing agents for paper, paint, rubber and plastics.

U.S. Pat. No. 5,203,918 to C. A. Rice discloses a relatively low temperature (room temperature) process of forming an aggregated pigment from kaolin by intermixing the kaolin slurry with 10–20% alum by weight of kaolin and 15–30% sodium silicate, followed by filtering and drying the slurry. The products are characterized as having a coarser particle size distribution and higher pore volume compared to the starting kaolin and are useful in coating and filling of papers.

Demmel U.S. Pat. Nos. 5,190,902 and 5,288,739, disclose the mixture of kaolin clay particles either at a very low pH (1.0 to 3.0) or a high pH (10.0 to 14.0) with ammonium phosphate compounds in a concentration of 2 to 20% by weight, followed by spray drying and calcining at temperatures between 538° C. and 1,066° C. The Demmel disclosures, however, are related to the production of a different product, namely attrition-resistant binder particles with vitreous qualities for binding catalyst particles into microspheroids used in fluid catalytic cracking processes. These abrasive, attrition-resistant binder particles are tough and not amenable for application to paper as a coating pigment because of their abrasion characteristics. In addition, the abrasive, attrition-resistant binder particles prepared according to the Demmel disclosures are large (approximately 65 microns in diameter) and are unsuitable for paper coating applications in which particle diameters below 45 microns are desirable.

What is needed are improved chemically aggregated kaolin clay pigments and a process for making such pigments. This method should avoid the use of calcining temperatures and should produce a chemically aggregated kaolin clay pigment with improved paper coating performance, ink receptivity, light scattering ability, porosity, and gloss compared to the starting pigment.

SUMMARY OF THE INVENTION

The present invention provides an inexpensive process for making aggregated or structured kaolin clay pigments using aluminum phosphate bonds, at temperatures between 5° C. and 200° C. The resulting pigments display improved light scattering ability, higher porosity with optimum pore or void size for light scattering and ink receptivity over that of the starting pigments. These improved properties make the pigment of the present invention highly suitable for paper coating and filling applications.

The present invention provides for the treatment of aluminum-containing kaolin clay particles with a phosphate-containing compound and optionally an additional aluminum compound, to create agglomerates of the kaolin using amorphous aluminum phosphate bonds. In addition to kaolin clay particles that are fine-grained or coarse-grained particles, other sources of kaolin may be used as the starting kaolin material in the process of the invention. These sources include the use of kaolin clay particles which may be obtained from various process streams such as froth flotation, selective flocculation, magnetic separation and centrifugation.

The agglomerated kaolin enhances the light scattering capability of the kaolin pigment and increases the bulking and porous properties of kaolin pigment. Coated paper properties such as light scattering ability and ink receptivity will also be enhanced.

Therefore, an object of the invention is to provide an inexpensive process for making an aggregated, structured kaolin clay pigment using aluminum phosphate bonds, the process being conducted at temperatures between 5° C. and 200° C.

A further object of the invention is to provide an aggregated structured kaolin clay pigment which has improved paper coating performance, light scattering ability, higher porosity with optimum pore or void size for light scattering and ink receptivity over that of the starting pigment.

An additional object of the invention is to provide a process for making an aggregated, structured kaolin clay pigment that reduces or eliminates the need for $TiO_2$.

A further object of the invention is to provide a process for making aggregated, structured kaolin clay pigment that avoids the need for high levels of heat, thereby decreasing the energy required for production and associated costs.

Another object of the invention is to provide a process for making an aggregated, structured kaolin clay pigment that avoids the need for high levels of heat, thereby decreasing the occupational hazards to workers in the kaolin industry.

A further object of the invention is to provide improved aggregated, structured kaolin clay pigments resulting from this process.

An additional object of the invention is to use these improved kaolin clay pigments to produce coated paper that is lighter in weight than papers coated with conventional kaolin clay pigments.

A further object of the invention is to provide improved structured kaolin clay pigments that can be shipped at a higher solids content, thereby reducing transportation costs.

These and other objects, features and advantages of the present invention will become apparent from the following detailed description.

DETAILED DESCRIPTION OF THE INVENTION

This invention provides a process for manufacturing chemically aggregated, structured, opacifying kaolin clay pigments, wherein the process comprises the steps of: a) mixing aluminum-containing kaolin clay particles with water at a pH no greater than 2.8 in order to leach aluminum from the kaolin clay particles; b) adding a phosphate compound; and c) increasing the pH of the mixture to a value above 2.8 but no greater than 6.0, wherein each step occurs at a temperature between 5° C. and 200° C. This invention also provides the chemically aggregated, structured, opacifying kaolin clay pigments resulting from this process.

In addition, this invention provides a process for manufacturing chemically aggregated, structured, opacifying kaolin clay pigments, wherein the process comprises the steps of: a) mixing aluminum-containing kaolin clay particles with water and a phosphate compound; b) adding a soluble aluminum compound to the mixture; and c) maintaining the pH of the mixture at a value between above 2.8 and but no more than 6.0, wherein each step occurs at a temperature between 5° C. and 200° C. This invention also provides the chemically aggregated, structured, opacifying kaolin clay pigments resulting from this process.

The aluminum which is required for the process of this invention may be derived from either (a) the kaolin starting material (i.e., endogenous aluminum), and/or (b) a soluble external source (i.e., exogenous aluminum).

Examples of the kaolin clay particles which may be used in this invention include fine-grained kaolin particles, coarse-grained kaolin particles, No. 1 high brightness coating clays (such as those sold under the trademark Kaogloss 90 by Thiele Kaolin Company, Sandersville, Ga.), No. 1 fine high brightness coating clays (such as those sold under the trademark Kaofine 90 by Thiele Kaolin Company), various other coating clays including Tertiary and Cretaceous kaolin clays and kaolin clays obtained from froth flotation, selective flocculation, magnetic separation, delamination and centrifugation.

The phosphate which is required for the process of this invention may be derived from any soluble phosphate containing compound, examples of which include; sodium hexametaphosphate, tetrasodium pyrophosphate, sodium tripolyphosphate, monosodium phosphate, disodium phosphate, monoammonium phosphate, diammonium phosphate and mixtures thereof.

When endogenous aluminum is used as the aluminum source, the pH of the kaolin suspension is decreased to a value of 2.8 or less in order to facilitate leaching of the aluminum from the kaolin. In one embodiment of the invention, aluminum-containing kaolin clay particles suspended in water are mixed with about 0.5 to 20 weight % phosphoric acid (85% pure). The pH of the resulting mixture is below 2.8.

When endogenous aluminum is used as the aluminum source, the leached aluminum to phosphate (Al:P) mole ratio may be varied from 0.001:1 to 5:1, preferably 0.5:1 to 4:1, with a most preferred range of 1:1 to 3:1. This reaction may be performed at any solution temperature between 5° C. and 200° C., preferably at room temperatures of approximately 22° C.–24° C. The phosphate compound is added in an amount to achieve a final phosphate concentration of between approximately 02 percent to 50 percent by weight of koalin.

Next, the pH of the mixture is increased to a value above 2.8 but no more than 6.0. The pH of the suspension containing the kaolin and the desired chemical constituents is raised by addition of a soluble basic compound in liquid or solid form such as by the addition of; potassium carbonate, sodium carbonate, sodium hydroxide, potassium hydroxide, ammonium hydroxide or a mixture thereof. At this point, chemically aggregated kaolin clay pigments are formed. Next, the mixture is preferably filtered and washed, and the pH is raised to a value between approximately 6.0 and 9.0. Each of these steps occurs at a temperature between 5° C. and 200° C.

In another embodiment of the invention, aluminum-containing kaolin clay particles are mixed with water at a pH below 2.8 in order to leach aluminum from the kaolin, a phosphate containing compound is added and then the pH is increased to a value above 2.8 but no more than 6.0 through the addition of a basic compound as described above. Each of these steps occurs at a temperature between 5° C. and 200° C.

The phosphate containing compound may be added to the mixture of kaolin clay particles in water before the addition of a compound to decrease the pH of the mixture to a value below 2.8. While the compound used to decrease the pH below 2.8 is preferably phosphoric acid or another phosphate containing compound, several other compounds may be used in the practice of this invention to lower the pH, including various acids such as sulfuric acid, hydrochloric acid, nitric acid and mixtures thereof.

The addition of heat is not required to leach endogenous aluminum from the kaolin. Aging the mixture for various periods of time facilitates the leaching of aluminum from the kaolin. We have observed that aging the kaolin suspension at approximately 25° C. for 120 hours is sufficient to leach sufficient amounts of endogenous aluminum from kaolin to practice the invention. Different periods of time may be employed at this and other temperatures to maximize leaching of the aluminum from kaolin. Alternatively, aluminum leaching may occur at temperatures between 5° C. and 200° C., such as 33° C., which may occur in outdoor holding tanks. The pH of the suspension containing the kaolin and the desired chemical constituents is then raised by addition of a soluble basic compound in liquid or solid form including but not limited to the following basic compounds; potassium carbonate, sodium carbonate, sodium hydroxide, potassium hydroxide, and ammonium hydroxide and mixtures thereof. The pH must be raised above 2.8 but no more than 6.0. During this step, aggregated kaolin clay pigments are formed. The suspension may be washed and filtered or centrifuged several times to remove excess chemicals that may hinder viscosity. The resulting filter cake or centrifuge cake can be resuspended at high solids or spray dried.

In another embodiment of the invention in which aluminum is derived from the kaolin itself, following the addition and mixing of a phosphate containing compound to reduce the pH of the mixture to a value of no more than 2.8, the suspension is heated above room temperature but below 200° C. for a period of time in order to facilitate leaching the aluminum from the kaolin. The pH is raised to a value above 2.8 but no more than 6.0 by addition of a base, selected from the group including, but not limited to the following; potassium carbonate, sodium carbonate, sodium hydroxide, potassium hydroxide, ammonium hydroxide, or mixtures thereof, and the suspension is allowed to age for a period of time. During this step, aggregated kaolin clay pigments are formed. This step may be followed by filtration and rinsing. The suspension may be spray dried after raising the pH to levels between approximately 6.0 and 9.0.

When the endogenous aluminum in the kaolin is not used as the sole source of aluminum, then any exogenous soluble aluminum source can be used. The aluminum source may be: aluminum sulfate, aluminum chloride, aluminum oxide, aluminum hydroxide, aluminum oxyhydroxide, aluminum acetate, aluminum nitrate, aluminum isopropoxide, aluminum butoxide, aluminum oxide, colloidal alumina, etc., and mixtures thereof. It is understood that at particular pH values of the mixture, certain aluminum containing compounds such as aluminum hydroxide must be in solution before adding to the mixture of kaolin clay particles. At other pH values, granular aluminum compounds may be added and readily dissolved in the mixture of kaolin clay particles. If the external source of aluminum is to be used, the solubilized aluminum to phosphate (Al:P) mole ratio may be varied from 0.01:1 to 5:1, with a preferred range of 1:1 to 3:1. This reaction may be performed at any solution temperature between 5° C. and 200° C., preferably at room temperatures of approximately 22° C.—24° C. The phosphate compound is added in an amount to achieve a final phosphate concentration of between approximately 0.2 percent to 50 percent by weight of koalin.

A preferred reaction condition involves first mixing kaolin clay particles, water and a phosphate compound to achieve a final pH of the mixture of no more than 6. Next, a soluble aluminum compound is added to achieve an Al:P ratio of about 2:1 at a solution temperature of 23° C. The temperature may be increased to accelerate the reaction. After mixing with aluminum, the pH is maintained at a value above 2.8 but no more than 6.0 by addition of a base, such as potassium carbonate, sodium carbonate, sodium hydroxide, potassium hydroxide, ammonium hydroxide and mixtures thereof, and the suspension is allowed to age for a period of time ranging from seconds to months. Maintaining the pH is defined as optionally leaving the pH at a value above 2.8 but no more than 6.0 without further adjustment if the pH of the mixture is within this range after dissolving the soluble aluminum compound. Maintaining the pH additionally includes raising the pH to a value between 2.8 and 6.0 if the pH of the mixture is below 2.8 after dissolving the soluble aluminum compound. Maintaining the pH also includes raising the pH to a value between 2.8 and 6.0 if the pH of the mixture is at some value within this range and the desired final pH within this range is higher. During this step, aggregated kaolin clay pigments are formed. This step may be followed by filtration and rinsing. The suspension may be spray dried after raising the pH to levels between approximately 6.0 and 9.0.

When exogenous aluminum is used in the practice of the invention, the kaolin clay particles may be added to water and a phosphate containing compound followed by the addition of a soluble aluminum containing compound. Alternatively, the soluble aluminum containing compound may be added to the mixture of kaolin clay particles in water followed by the addition of the phosphate containing compound. In either case, after these steps, the pH is maintained at a value above 2.8 but no more than 6.0 by addition of a base as described above. During this step, aggregated kaolin clay pigments are formed. The suspension may be washed and filtered or centrifuged several times to remove excess chemicals that may hinder viscosity. The resulting filter cake or centrifuge cake can be resuspended at high solids or spray dried.

We have determined that equal moles of aluminum (from exogenous sources) and phosphate are retained when both chemicals are added from non-kaolinite sources. In one experiment in which no exogenous aluminum was added, we have measured that 0.53% phosphorus/kaolin (g/g) remains after heating, raising the pH and washing. If this 1:1 mole relationship of aluminum to phosphate is also found in conditions when the endogenous aluminum leached from kaolin is used, then at least 0.46% aluminum/kaolin (g/g) is present in the aluminum phosphate bonds having been leached from the kaolin. Therefore, the endogenous aluminum in kaolin is sufficient to practice the invention.

The processes of this invention do not employ temperatures greater than 200° C., and do not employ any calcination conditions, thereby preventing the formation of hard abrasive particles. Hard abrasive particles cause wear and tear of paper coating machines and are therefore not desirable in paper coating pigments.

The procedure of the present invention produces a kaolin pigment whose light scattering capability is improved as much as 70% over the feed material. The starting kaolin samples used in the following examples had light scattering coefficients of 430 ft$^2$/lb for the coarse-grained Cretaceous kaolin product and 450 ft$^2$/lb for the fine-grained Tertiary kaolin product.

X-ray powder diffraction analysis indicates that the product is essentially a kaolin clay. No peaks (signature) for aluminum phosphate are present indicating the amorphous nature of the aluminum phosphate species. The chemical analysis, however, shows that about 50%–90% of the aluminum and phosphorus initially added remains in the final product. Both from the X-ray diffraction and the chemical analysis, the following aluminum phosphate species are believed to have formed:

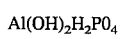

$Al(OH)_2H_2PO_4$

$AlOHNaPO_4$

The precipitation of these amorphous aluminum phosphate species between the kaolin particles and/or the formation of continuous coatings of these species around kaolin particles are believed to be responsible for the aggregation of the kaolin platelets. These aggregates in turn provide the sites for light scattering and ink receptivity.

The present invention is further illustrated by the following examples which are illustrative of certain embodiments designed to teach those of ordinary skill in the art how to practice this invention and to represent the best mode contemplated for carrying out this invention.

In the following Examples and Tables, various parameters such as K & N ink receptivity, GE brightness, etc. are determined using methods and tests as described above and referenced below. Light scattering ability of the pigment is estimated by the light scattering coefficient using the Kubelka-Munk equation as described in TAPPI 1978, Vol. 61, No. 6, pages 78–80. Pore size and pore volume are measured by mercury intrusion as described in the American Society for Testing and Materials (ASTM) method D 4284–92. The K & N ink receptivity test is described by Rice, Varnishing Characteristics of Coating Clays and Pigments, TAPPI, Vol. 39 (1), pp. 43–45, and in TAPPI Routine Control Method RC 19 (referenced in preceding article on pp. 44). GE brightness of the clay pigment is measured using the TAPPI test method, T-646 om-94. ISO brightness of the clay pigment is measured using the TAPPI test method, T-532 pm-92. The Hunter b-value of the clay pigment is measured using the TAPPI test method, T-524 om-94.

EXAMPLE I

About 900 g of predispersed Tertiary kaolin clay product sold by Thiele Kaolin Company under the trademark Kaofine 90 (98% <2 microns and 87% <0.5 microns in equivalent spherical diameter (esd)) is mixed with 2000 g water for 2 hours. Approximately 85 g of phosphoric acid is added to the suspension and stirred for 10 min. Next, 147 g of aluminum sulfate is added to the suspension and stirred for another 10 min. The pH of the resulting suspension decreases to 1.5. The pH of the suspension is slowly raised to 4.0 by adding sodium hydroxide while stirring. The suspension sits for 16 hours, is stirred again and the pH readjusted to 4.0. The suspension is washed and triple filtered at a pH of 4.0. Filtration occurs through standard laboratory vacuum filter paper such as paper with a 2 micron pore size. The clay is resuspended at 20 weight % solids. The pH is adjusted to 7.0 with sodium hydroxide, 0.7 weight % (clay/dispersant) sodium polyacrylate is added, and the suspension is spray dried.

EXAMPLE II

The procedure of Example I is followed, but the kaolin mass is raised to 925 g, and phosphoric acid and aluminum sulfate are decreased to 64 g and 111 g, respectively.

EXAMPLE III

The procedure of Example I is followed, but the kaolin mass is increased to 950 g, while phosphoric acid and aluminum sulfate are decreased to 42.5 g and 73.5 g, respectively.

EXAMPLE IV

The procedure of Example I is followed, but the kaolin mass is raised to 975 g, and phosphoric acid and aluminum sulfate are lowered to 21.3 g and 36.8 g, respectively.

EXAMPLE V

The procedure of Example I is followed, but 2800 g of a Cretaceous kaolin (Kaogloss 90 (KG90 from Thiele Kaolin Company)), 7000 g of water, 264 g of phosphoric acid and 455 g of aluminum sulfate (alum) are used.

EXAMPLE VI

The procedure of Example V is followed, but the amount of phosphoric acid and aluminum sulfate are decreased to 125 g and 215 g, respectively.

The products of Examples I–VI are thus measured for various properties, and the results are shown in Table I. The properties of Kaofine 90 and Kaogloss 90 materials, which are not treated by the process of this invention are also shown in Table I for comparison purposes.

EXAMPLE VIII

The procedure of Example VII is followed, but the phosphoric acid is decreased to 85 g.

EXAMPLE IX

The procedure of Example VII is followed, but the phosphoric acid is decreased to 43 g.

EXAMPLE X

The procedure of Example VII is followed, but the temperature of the oven is increased to 120° C. The resulting scattering coefficient is 610 ft²/lb.

TABLE I

| Example | Kaofine 90 | I | II | III | IV | Kaogloss 90 | V | VI |
|---|---|---|---|---|---|---|---|---|
| Scattering Coefficient (ft²/lb) (457 nm) | 450 | 700 | 650 | 600 | 560 | 430 | 620 | 580 |
| Pore Volume (g/ml) | 0.28 | 0.45 | 0.41 | 0.39 | 0.37 | 0.26 | 0.49 | 0.41 |
| Median Pore Size (microns) | 0.05 | 0.12 | 0.1 | 0.08 | 0.08 | 0.06 | 0.18 | 0.13 |
| GE Brightness | 91.0 | 92.3 | 92.5 | 92.1 | 92.0 | 90.4 | 90.8 | 90.9 |
| Hunter b-value | 2.0 | 1.8 | 1.7 | 1.8 | 1.8 | 2.3 | 2.0 | 2.0 |

EXAMPLE VII

Approximately 800 g of predispersed Tertiary kaolin clay product (98% <2 microns and 87% <0.5 microns) is mixed with 2000 g water for 2 hours. About 170 g of phosphoric acid is added to the suspension and stirred for 1 hour. The pH of the suspension decreases to 1.5. The suspension is poured into four 1000 ml plastic bottles, which are sealed and placed in an oven at 90° C. for 8 hours to expedite leaching of aluminum from the kaolinite structure. Every 2 hours the bottled suspensions are vented by loosening container lids and shaking for 2 min to retard settling and to redistribute chemicals. The pH of the suspension is slowly raised to 4.0 using sodium hydroxide while stirring. The suspension sits for 16 hours, is stirred and the pH readjusted to 4.0. The suspension is washed and triple filtered at a constant pH of 4.0. The clay is resuspended at 20 weight % solids. The pH is adjusted to 7.0 with sodium hydroxide, 0.7 weight % (dispersant/clay) sodium polyacrylate is added, and the suspension spray dried.

EXAMPLE XI

The procedure of Example VII is followed, but the kaolin suspensions are not heated to 90° C., and are instead aged 120 hours at 25° C. This example shows that aging a kaolin suspension with phosphoric acid for days with no external aluminum added and no heat is sufficient to leach out aluminum to be used for the structuring.

EXAMPLE XII

The procedure of Example VII is followed, but a Cretaceous kaolin clay product (90% <2 microns and 48% <0.5 microns, esd) is used.

The products of Examples VII–IX and XI–XII are thus measured for various properties, and the results are shown in Table II. The properties of Kaofine 90 and Kaogloss 90 materials, which are not treated by the process of this invention are also shown in Table II for comparison purposes.

TABLE II

| Example | Kaofine 90 | VII | VIII | IX | XI | Kaogloss 90 | XII |
|---|---|---|---|---|---|---|---|
| Scattering Coefficient (ft²/lb) (457 nm) | 450 | 720 | 670 | 560 | 540 | 430 | 580 |
| Pore Volume (g/ml) | 0.28 | — | 0.38 | 0.39 | — | — | — |

TABLE II-continued

| Example | Kaofine 90 | VII | VIII | IX | XI | Kaogloss 90 | XII |
|---|---|---|---|---|---|---|---|
| Median Pore Size (microns) | 0.05 | — | 0.07 | 0.08 | — | — | — |
| GE Brightness | 91.0 | 92.1 | 92.4 | 92.0 | 92.0 | 90.4 | 91.6 |
| Hunter b-value | 2.0 | 1.7 | 1.6 | 1.8 | 1.8 | 2.3 | 2.0 |

EXAMPLE XIII

Various structured kaolin products of the present invention are evaluated in a typical coating formulation for their suitability in lightweight coating applications. The coated sheet data are compared against commercial products with high brightness. As discussed in the background section of the application, a coating is applied to a paper to improve the printability and other desirable properties, such as brightness, opacity, gloss, etc. The supercalendered coated sheet properties are presented in Table III and Table IV. The data in Table III are from the structured pigments prepared from the fine East Georgia clay sold by Thiele Kaolin Company under the trademark Kaofine 90. Table IV consists of the data for the products prepared from the Middle Georgia clay sold by the Thiele Kaolin Company under the trademark Kaogloss 90. The tables clearly indicate that the products of the present invention have improved brightness, opacity, gloss and ink receptivity (absorbency) over the control (commercial products).

The products of Examples I, II, VIII and also V and VI are thus measured for various properties, and the results are shown in Tables III and IV, respectively. The properties of Kaofine 90 and Kaogloss 90 materials, which are not treated by the process of this invention are also shown in Tables III and IV, respectively, for comparison purposes.

TABLE III

| Example | Kaofine 90 | I | II | VIII |
|---|---|---|---|---|
| GE Brightness | 68.6 | 71.1 | 71.0 | 71.1 |
| ISO Brightness | 66.4 | 68.8 | 68.5 | 68.5 |
| Gloss | 62 | 65 | 68 | 66 |
| Opacity | 87.0 | 88.0 | 87.9 | 87.8 |
| K&N Ink Receptivity | 21.4 | 28.1 | 31.0 | 27.6 |

TABLE IV

| Example | Kaogloss 90 | V | VI |
|---|---|---|---|
| GE Brightness | 68.4 | 70.9 | 69.6 |
| ISO Brightness | 66.1 | 68.2 | 67.2 |
| Gloss | 63 | 66 | 63 |
| Opacity | 86.1 | 87.7 | 87.4 |
| K&N Ink Receptivity | 21.5 | 30.1 | 28.0 |

Examples XIV and XV which follow show that by doubling the aluminum to phosphorous ratio, there is more efficient use of phosphorous and a greater light scatter is produced. Example XV also gives the lowest phosphoric acid concentration tested (see Table V).

EXAMPLE XIV

The procedure of Example I is followed, but the kaolin mass is increased to 950 g, and the phosphoric acid and aluminum sulfate decreased to 42.5 g and 149 g, respectively. This doubled the ratio of aluminum to phosphorous in order to more efficiently use phosphorous.

EXAMPLE XV

The procedure of Example I is followed, but the kaolin mass is raised to 995 g, and the phosphoric acid and aluminum sulfate decreased to 4.25 g and 15 g, respectively. This example also doubles the ratio of aluminum to phosphorous to more efficiently use phosphorous and provides the lowest tested amount of phosphorous that causes a significant improvement in light scatter.

The products of Examples XIV–XVI are thus measured for various properties, and the results are shown in Table V.

TABLE V

| Example | XIV | XV | XVI |
|---|---|---|---|
| Scatter Coefficient (ft²/lb) (457 nm) | 700 | 490 | 640 |
| Brightness | 92.1 | 91.5 | 92.0 |
| Hunter b-value | 1.8 | 1.9 | 1.8 |

EXAMPLE XVI

Work also has been done on other feed kaolin samples with triple the mole ratio of aluminum to phosphorous (3:1). The procedure of Example I is followed, but the kaolin mass is raised to 975 g, and the phosphoric acid and aluminum sulfate decreased to 21.3 g and 113 g, respectively. These data show that use of a ratio of 0.5 to 20% phosphoric acid/kaolin creates structured pigments, and that ratios of 0 to 3 times aluminum to phosphorous can be used.

EXAMPLE XVII

In addition to phosphoric acid, other compounds may be used to lower the pH of the mixture. In this example, about 800 g of a Tertiary kaolin product are mixed in 2000 g of water. Approximately 200 g of sodium hexametaphosphate are added and the pH of the mixture is lowered to about 2.0 with sulfuric acid. The suspension is poured into four 1000 ml plastic bottles which are then sealed and placed in an oven at 90° C. for 8 hours to expedite removal of aluminum from the kaolin clay particles. The pH of the suspension is then raised to 4.0 with sodium hydroxide. Next, the suspension is washed, dispersed, and spray dried following the procedures shown in Example VII. The scatter measurement is: 457 nm scatter coefficient =580 ft²/lb.

The invention has been described in detail with particular reference to certain embodiments, but variations and modifications can be made without departing from the spirit and the scope of the invention as defined in the appended claims.

We claim:

1. A process for manufacturing chemically aggregated, structured, opacifying kaolin clay pigments, wherein the process comprises the steps of:

A. mixing aluminum-containing kaolin clay particles with water at a pH no greater than 2.8 in order to leach aluminum from the kaolin clay particles, B. adding a phosphate compound; and C. increasing the pH of the mixture to a value above 2.8 but no greater than 6.0, wherein each step occurs at a temperature between 5° C. and 200° C.

2. The process of claim 1, further comprising the sequential steps of:

D. filtering and washing the mixture; and then,

E. raising the pH of the mixture to a value between approximately 6.0 and 9.0, wherein each step occurs at a temperature between 5° C. and 200° C.

3. A process as defined in claim 1, wherein the phosphate compound is selected from the group consisting of phosphoric acid, sodium hexametaphosphate, monosodium phosphate, tetrasodium pyrophosphate, sodium tripolyphosphate, disodium phosphate, monoammonium phosphate, diammonium phosphate, and mixtures thereof.

4. A process as defined in claim 1, wherein the phosphate compound is phosphoric acid which is added to achieve a final phosphate concentration of between approximately 0.2% to 50% by weight.

5. A process as defined in claim 1, having a mole ratio of leached aluminum:phosphate or approximately 0.001:1 to 5:1.

6. A process as defined in claim 5, wherein the mole ratio of leached aluminum:phosphate is approximately 1:1 to 3:1.

7. A process as defined in claim 1, wherein the pH of the mixture is increased to a value above 2.8 but no greater than 6.0 with a basic compound selected from the group consisting of sodium hydroxide, potassium hydroxide, sodium carbonate, potassium carbonate, ammonium hydroxide, and mixtures thereof.

8. A process as defined in claim 2, wherein the mixture is spray dried after the completion of step E.

9. A process as defined in claim 2, wherein step D is repeated 1 to 4 times.

10. A process as defined in claim 1, wherein each step occurs at a temperature between 80° C. and 98° C.

11. A process for manufacturing chemically aggregated, structured, opacifying kaolin clay pigments, wherein the process comprises the steps of:

A. mixing aluminum-containing kaolin clay particles with water and a phosphate compound at a pH no greater than 2.8 in order to leach aluminum from the kaolin clay particles; and B. increasing the pH of the mixture to a value above 2.8 but no greater than 6.0, wherein each step occurs at a temperature between 5° C. and 200° C.

12. A process for manufacturing chemically aggregated, structured, opacifying kaolin clay pigments, wherein the process comprises the steps of:

A. mixing aluminum-containing kaolin clay particles with water and a phosphate compound;

B. adding a soluble aluminum compound to the mixture; and

C. maintaining the mixture at a pH of above 2.8 and but no more than 6.0, wherein each step occurs at a temperature between 5° C. and 200° C.

13. The process of claim 12, further comprising the sequential steps of:

D. filtering and washing the mixture; and

E. raising the pH of the mixture to a value between approximately 6.0 and 9.0, wherein each step occurs at a temperature between 5° C. and 200° C.

14. A process as defined in claim 12, wherein the phosphate compound is selected from the group consisting of phosphoric acid, sodium hexametaphosphate, monosodium phosphate, disodium phosphate, tetrasodium pyrophosphate, sodium tripolyphosphate, monoammonium phosphate, diammonium phosphate, and mixtures thereof.

15. A process as defined in claim 12, wherein the phosphate compound is phosphoric acid which is added to achieve a final phosphate concentration in step A of between approximately 0.2% to 50% by weight.

16. A process as defined in claim 12, wherein the soluble aluminum compound comprises aluminum sulfate, aluminum chloride, aluminum hydroxide, aluminum oxyhydroxide, aluminum acetate, aluminum nitrate, aluminum isopropoxide, aluminum butoxide, aluminum oxide, colloidal alumina, or mixtures thereof.

17. A process as defined in claim 12, having a mole ratio of solubilized aluminum:phosphate of approximately 0.01:1 to 5:1.

18. A process as defined in claim 12, wherein the mole ratio of solubilized aluminum:phosphate is approximately 1:1 to 3:1.

19. A process as defined in claim 12, wherein the pH of the mixture in step C is maintained with a basic compound selected from the group consisting of sodium hydroxide, potassium hydroxide, sodium carbonate, potassium carbonate, ammonium hydroxide, and mixtures thereof.

20. A process as defined in claim 13, wherein after step E the mixture is spray dried.

21. A process as defined in claim 13, wherein step D is repeated 1 to 4 times.

22. An opacifying, chemically aggregated, structured, kaolin clay pigment manufactured by the process of claim 1.

23. An opacifying, chemically aggregated, structured, kaolin clay pigment manufactured by the process of claim 12.

* * * * *

UNITED STATES PATENT AND TRADEMARK OFFICE
CERTIFICATE OF CORRECTION

PATENT NO. : 5,584,925

DATED : December 17, 1996

INVENTOR(S) : Chris B. Maxwell and Prakash B. Malla

It is certified that error appears in the above-identified patent and that said Letters Patent is hereby corrected as shown below:

At column 2, line 12, after the word "ability", please delete [o] and insert --of the-- therefor.

At column 3, line 1, after the phrase "fillers, as", please delete [TiO2] and insert --$TiO_2$-- therefor.

At column 5, line 33, after the word "approximately", please delete [02] and insert --0.2-- therefor.

At column 5, line 34, after the word "of", please delete [koalin] and insert --kaolin-- therefor.

At column 6, line 58, after the phrase "weight of", please delete [koalin] and insert --kaolin-- therefor.

At column 8, line 47, please delete [clay/dispersant] and insert --dispersant/clay-- therefor.

At column 10, line 14, after the phrase "but the", please delete [o].

At column 13, line 36 (Claim 5), after the word "phosphate", please delete [or] and insert --of-- therefor.

Signed and Sealed this

Ninth Day of December, 1997

*Attest:*

BRUCE LEHMAN

*Attesting Officer*     *Commissioner of Patents and Trademarks*